United States Patent Office 3,470,191
Patented Sept. 30, 1969

3,470,191
PROCESS FOR THE PREPARATION OF 3-ARYL-
AMINO-2-PYRAZOLIN-5-ONE
Pieter Hendrik Eerdekens, Mortsel-Antwerp, and Robert
Joseph Pollet, Berchem-Antwerp, Belgium, assignors
to Gevaert-Agfa N.V., Mortsel, Belgium, a Belgian
company
No Drawing. Filed Oct. 13, 1965, Ser. No. 495,688
Claims priority, application Great Britain, Oct. 15, 1964
42,087/64
Int. Cl. C07d 49/16, 57/00
U.S. Cl. 260—294.8                                    9 Claims

ABSTRACT OF THE DISCLOSURE

Improved yields of 3-arylamino-2-pyrazolin-5-one color couplers useful in photography are obtained by reacting a 3-amino-2-pyrazoline-5-one with the salt of a strong acid and an aromatic primary amino compound in a neutral or aliphatic acid medium.

---

This invention relates to a process for the preparation of 3-arylamino-2-pyrazolin-5-one.

From the United Kingdom patent specification 956,261 filed Sept. 11, 1961 by Ilford Ltd. it is known to prepare 3-arylamino-2-pyrazoline-5-one compounds having the following general formula:

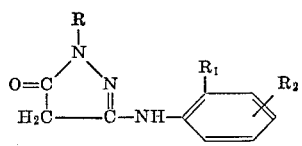

wherein:

R is a phenyl group or substituted phenyl group,
$R_1$ is a halogen atom, an alkyl group, an alkoxy group, a nitro group, or an acylamino group, and
$R_2$ is a hydrogen atom, a halogen atom, an alkyl group, an alkoxy group, a nitro group, or an acylamino group, by allowing a compound of the following general formula:

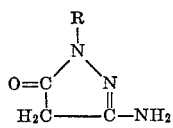

wherein R has the same significance as described above to react with an arylamine of the general formula:

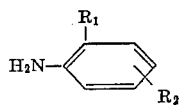

wherein $R_1$ and $R_2$ have the same significance as described above, in the presence of an acid condensing agent, preferably acetic acid.

From the Russian patent specification 141,485 filed Jan. 14, 1961, by I. A. Solov'Eva et al. it is known to prepare in a yield varying from 34 to 80% 1-aryl-3-aryl-amino-2-pyrazolin-5-one compounds having the following general formula:

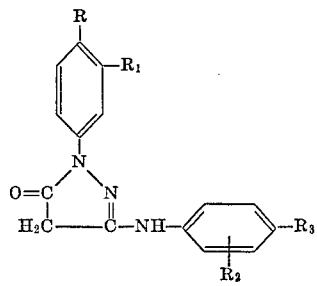

wherein:

R represents a hydrogen atom, a phenoxy group, a carboxyl group or sulphonic acid group,
$R_1$ represents a hydrogen atom, a carboxyl group, or a sulphonic acid group, and
$R_2$ and $R_3$ each represents an alkyl group containing 1 to 18 carbon atoms, a cycloalkyl group, an alkoxy group, an aryloxy group, a carbalkoxy group, an acylamino group, a dialkylamino group, a hydroxyl group, a nitro group, or a halogen atom, by heating 1-aryl-3-amino-2-pyrazolin-5-one for a long period with an excess of aromatic amine in a reaction medium consisting of aliphatic acids or aqueous solutions of aliphatic or aromatic acids.

It is an object of the present invention to provide a new and improved method for the preparation of 3-aryl-amino-2-pyrazolin-5-one compounds.

More particularly it is an object of the present invention to provide a method for preparing in a relatively short reaction time 3-arylamino-2-pyrazolin-5-one compounds in a very pure state and with a good yield.

According to the method of the present invention 3-arylamino-2-pyrazolin-5-one compounds are obtained by allowing 3-amino-2-pyrazolin-5-one compounds to react with the salt of a strong acid and an aromatic primary amino compound. The reaction proceeds very quickly when the starting compounds are dissolved in an organic aliphatic acid such as acetic acid.

The organic solvent having acid properties may contain some water, though not to such an extent that the starting products would precipitate or would not dissolve at boiling temperature.

Although an organic aliphatic acid such as acetic acid is used preferably as a solvent, some inert organic water-miscible solvents can be utilised and are preferred when the aromatic primary amines can be acetylated easily.

Organic inert non-acidic water-miscible solvents, which have proved to give good results are ethylene glycol monomethyl ether and tetrahydrothiophene-1,1-dioxide.

The condensation reaction is preferably carried out at reflux temperature.

Although the method for preparing 3-arylamino-2-pyrazolin-5-ones according to the present invention is particularly suited for condensing salts of strong acids and strongly basic aromatic primary amines, higher yields can also be obtained with salts of strong acids and less basic aromatic amines than according to the methods abovementioned, by following the method of the present invention. So it has been found that by boiling equimolar amounts of 1-phenyl-3-amino-2-pyrazolin-5-one and p-nitroaniline in acetic acid for 4 hours 1-phenyl-3-p-nitroanilino-2-pyrazolin-5-one was obtained in a yield of 7%. The yield of the reaction was improved to 21% when using a 10-fold excess of p-nitroaniline with a reaction time of 12 hours. A yield of 36% was obtained according to the method of the present invention by allowing to react equimolar amounts of 1-phenyl-3-amino-2-pyrazolin-5-one and p-nitroaniline hydrochloride for 2 hours in acetic acid at reflux temperature.

The high degree of purity of the 3-arylamino-2-pyrazolin-5-one prepared according to the present invention is directly due to the simple purification technique, which can be applied. After the reaction, the mixture is treated with water, e.g., by pouring into water, so that the ammonium salt of the strong acid formed during the reaction, the unreacted amine salt, if the case may be, and the unreacted 3-amino-2-pyrazolin-5-one, if any, dissolve whereas the resulting 3-arylamino-2-pyrazolin-5-one precipitates. The precipitated 3-arylamino-2-pyrazolin-5-one is filtered off, washed with water, and recrystallized from an appropriate solvent.

Strong acids, which are used to form the aromatic amine salts, are e.g. hydrochloric acid, hydrobromic acid, sulphuric acid and p-toluene sulphonic acid. However, in the condensation method of the present invention the hydrochlorides are preferably used.

As 3-arylamino-2-pyrazolin-5-one compounds, which according to the present invention can be made to react with the salt of a strong acid and an aromatic primary amino compound are mentioned compounds corresponding to the following general formula:

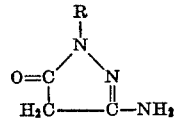

wherein:

R represents a hydrogen atom, an alkyl group, a substituted alkyl group, an aryl group, e.g. a phenyl group, or a substituted aryl group e.g. a substituted phenyl group, a heterocyclic residue or substituted heterocyclic residue, which residues are bound to the pyrazolone nucleus by a C-atom.

As aromatic primary amines, which in their salt form are allowed to react according to the method of the present invention are mentioned compounds corresponding to the following general formula:

Z—NH$_2$ wherein: Z represents an aromatic nucleus e.g. a nucleus of the benzene or naphthalene series. Among aromatic amines of the benzene series are mentioned the compounds complying with the following formulae:

wherein:

R$_1$ represents a substituent selected from alkyl, substituted alkyl, aryl, substituted aryl, halogen, e.g. chlorine, carbethoxy, acyl, acylamino, e.g. acetamido, alkoxy, e.g. methoxy, alkylthio, alkylsulphonyl, amino, substituted amino, e.g. alkylamino and anilino, arylamido, carbamyl, carboxy, cyano, hydroxyl, isothiocyano, mercapto, nitro, arylsulphonamido, arylureido, aryloxy, arylthio, arylsulphonyl, sulphamino, sulphamyl, fluorosulfonyl, or thiocyano, m is a positive integer at least 1 and at most 5.

3-arylamino-2-pyrazolin-5-one compounds prepared according to the present invention and, which can form substantially magenta-coloured azomethine dyes on coupling with oxidised aromatic primary amino developing agents used in colour photography, are listed in the following table.

I.

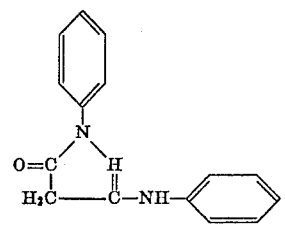

II.

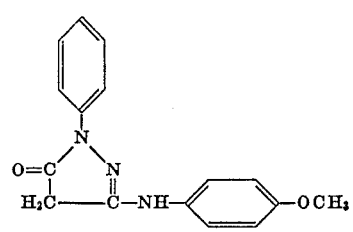

III.

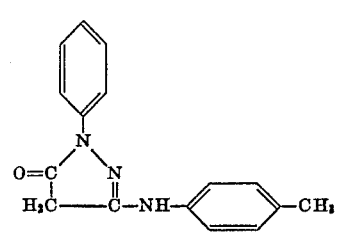

IV.

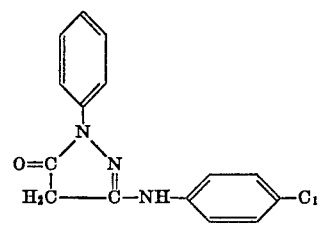

V.

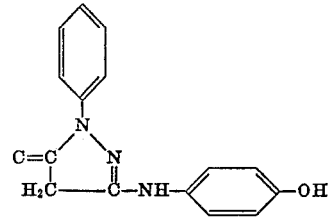

VI.

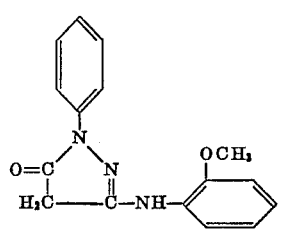

VII.

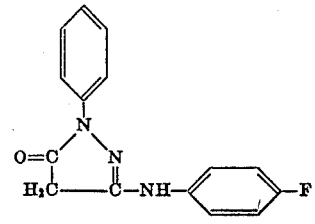

VIII. 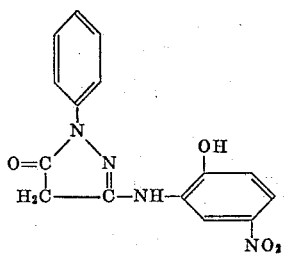

IX. 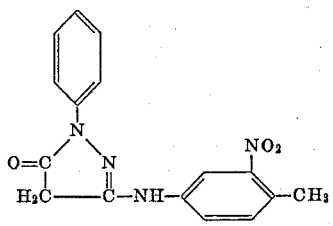

X. 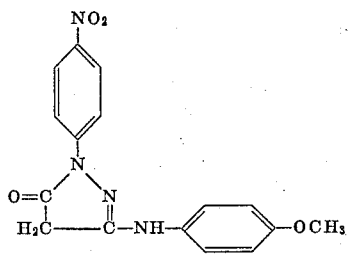

XI. 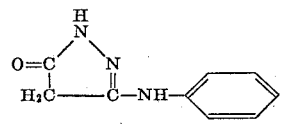

XII. 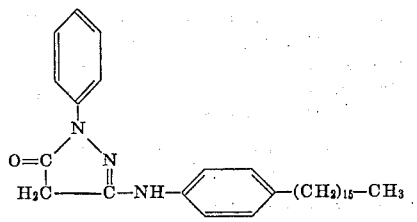

XIII. 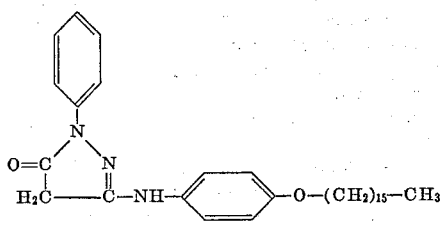

XIV. 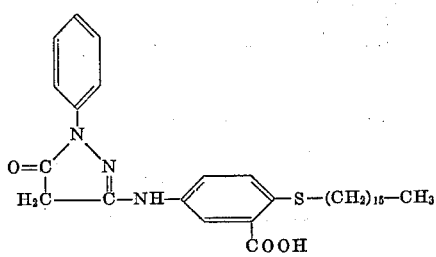

XV. 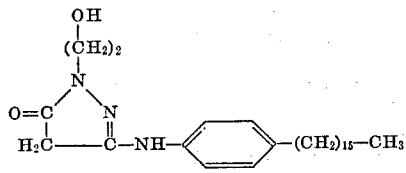

XVI. 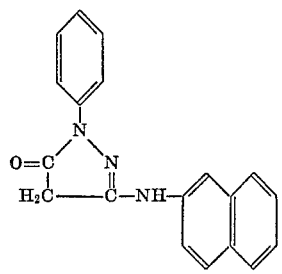

XVII. 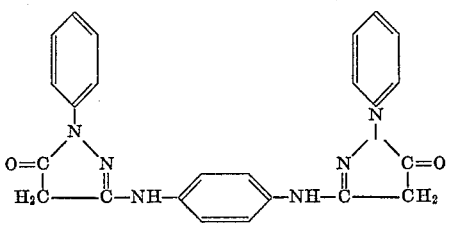

XVIII. 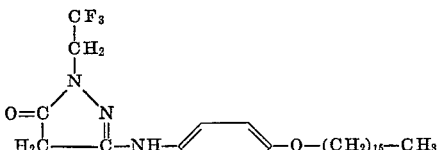

XIX. 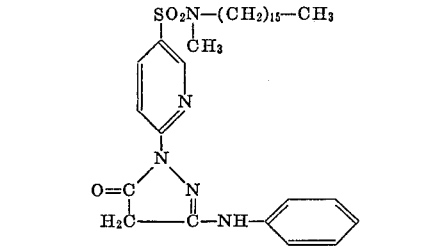

The method of the present invention is particularly suited for the preparation of the 1-fluoroalkyl-3-arylido-2-pyrazolin-5-one compounds according to U.S. patent application Ser. No. 472,017 filed July 14, 1965.

The following examples illustrate the present invention.

Example 1.—1-phenyl-3-anilino-2-pyrazolin-5-one (A) A mixture of 8.75 g. (0.05 mole) of 1-phenyl-3-amino-2-pyrazolin-5-one and 6.5 g. (0.05 mole) of aniline hydrochloride and 40 ccs. of acetic acid are boiled for 2 h. During the reaction a precipitate of ammonium chloride is formed. The reaction mixture is poured into water. The ammonium chloride and the unreacted 1-phenyl-3-amino-2-pyrazolin-5-one, if any, dissolve and the 3-anilino-2-pyrazolin-5-one deposits. This precipitate is filtered, washed with water and recrystallized from a mixture of ethanol and ethylene glycol monomethyl ether (3:1). The resulting product melts at 222° C. Yield: 6.5 g. (52%).

(B) A mixture of 8.75 g. (0.05 mole) of 1-phenyl-3-amino-2-pyrazolin-5-one and 6.5 g. (0.05 mole) of aniline hydrochloride and 20 ccs. of tetrahydrothiophene-1,1-dioxide is boiled for 20 minutes. During the reaction a precipitate of ammonium chloride is formed. The reaction mixture is poured into water. The precipitate is filtered, washed with water and recrystallized from a mixture of ethanol and ethylene glycol monomethyl ether (3:1). The resulting product melts at 222° C. Yield: 6 g. (48%).

Example 2.—1-phenyl-3-p-methoxyanilino-2-pyrazolin-5-one

Example 1 is repeated but aniline hydrochloride is replaced by 8 g. (0.05 mole) of p-anisidine hydrochloride. The resulting reaction product is recrystallised from ethanol. Melting point: 190° C. Yield: 11 g. (78.5%).

Example 3.—1-phenyl-3-p-toluidino-2-pyrazolin-5-one (A) Example 1 is reiterated, but aniline hydrochloride is replaced by 7.5 g. (0.05 mole) of p-toluidine hydrochloride. The resulting reaction product is recrystallised from ethanol. Melting point: 230° C. Yield: 9 g. (68%).

(B) Example 3A is repeated but p-toluidine hydrochloride is replaced by 13.3 g. (0.05 mole) of p-toluidine benzene sulphonate. After recrystallisation from ethanol a crystalline product melting at 230° C. is obtained. Yield: 7.2 g. (54.3%).

p-Toluidine benzene sulphonate is prepared according to Vogel, Textbook of Practical Organic Chemistry, third edition, p. 555.

(C) Example 3A is reiterated but p-toluidine hydrochloride is replaced by 9.4 g. (0.05 mole) of p-toluidine hydrobromide. The resulting product melts at 230° C. Yield: 7.7 g. (58%).

Example 4.—1-phenyl-3-p-chloro-anilino-2-pyrazolin-5-one

Example 1 is repeated but aniline hydrochloride is replaced by 8.2 g. (0.05 mole) of p-chloro-aniline hydrochloride. The resulting reaction product is recrystallised from a mixture of ethanol and ethylene glycol monomethyl ether (3:1). Melting point: 232° C. Yield: 8 g. (56%).

Example 5.—1-phenyl-3-p-hydroxy-anilino-2-pyrazolin-5-one

Example 1 is reiterated but aniline hydrochloride is replaced by 7.25 g. (0.05 mole) of p-aminophenol hydrochloride. A crystalline product melting at 216° C. is obtained after recrystallisation from ethanol/water. Yield: 9.2 g. (71%).

Example 6.—1-phenyl-3-o-methoxyanilino-2-pyrazolin-5-one (A) Preparation according to our invention. Example 1 is reiterated but aniline hydrochloride is replaced by 8 g. (0.05 mole) of o-anisidine hydrochloride. After recrystallisation from ethanol a crystalline product melting at 178° C. is obtained. Yield: 9.7 g. or 69.3%.

(B) Preparation according to U.S. patent specification 3,127,269.—8.75 g. (0.05 mole) of 1-phenyl-3-amino-2-pyrazolin-5-one and 6.2 g. (0.05 mole) of ortho-anisidine are refluxed for 4 hours in acetic acid and stirred mechanically. The mixture is cooled and poured into diluted hydrochloric acid. The resulting precipitate is filtered, washed with water and dried. After recrystallisation from ethanol a crystalline product melting at 178° C. is obtained. Yield: 7 g. (50%).

Example 7.—1-phenyl-3-p-fluoroanilino-2-pyrazolin-5-one 8.75 g. (0.05 mole) of 1-phenyl-3-amino-2-pyrazolin-5-one and 7.4 g. (0.05 mole) of p-fluoroaniline hydrochloride are refluxed for 2 hours and mechanically stirred in 60 ccs. of ethylene glycol monomethyl ether. The reaction mixture containing a precipitate of ammonium chloride is poured into diluted hydrochloric acid. The resulting precipitate is filtered and recrystallised from ethanol/ethylene glycol monomethyl ether (3:1). Needles melting at 215° C. are obtained. Yield: 5.5 g. (41.2%).

Example 8.—1-phenyl-3-(2-hydroxy-5-nitro)-anilino-2-pyrazolin-5-one 8.75 g. (0.05 mole) of 1-phenyl-3-amino-2-pyrazolin-5-one and 9.6 g. (0.05 mole) of 2-hydroxy-5-nitroaniline hydrochloride are refluxed in 60 ccs. of acetic acid for 2 hours and stirred mechanically. After heating for approximately 30 minutes an amorphous brown-reddish precipitate starts settling. After cooling this precipitate is filtered and washed with water. The product melts at 262° C. and is very pure. A higher melting point is not obtained after recrystallisation from ethanol/ethylene glycol monomethyl ether (3:1). Yield: 7.5 g. (50%).

Example 9.—1-phenyl-3-(4-methyl-5-nitro)-anilino-2-pyrazolin-5-one

Example 1 is reiterated but aniline hydrochloride is replaced by 9.5 g. (0.05 mole) of 4-methyl-5-nitro-anilino hydrochloride. The resulting reaction product is boiled in ethanol and does not dissolve. It is then filtered while warm. Dark brown needles melting at 220° C. are obtained. Yield: 10.75 g. (69.3%).

Example 10.—1-p-nitrophenyl-3-p-methoxyanilino-2-pyrazolin-5-one 11 g. (0.05 mole) of 1-p-nitrophenyl-3-amino-2-pyrazolin-5-one and 8 g. (0.05 mole) of p-anisidine hydrochloride are made to react by mixing and heating in 50 ccs. of acetic acid. The resulting reaction product is separated and treated with boiling ethanol in which impurities dissolve. The product thus treated is filtered while warm and next washed with water. After recrystallisation from a mixture of ethanol/ethylene glycol monomethyl ether (3:1) the product melts at 234° C. Yield: 9 g. (58%).

Example 11.—3-anilino-2-pyrazolin-5-one 5 g. (0.05 mole) of 3-amino-2-pyrazolin-5-one and 6.5 g. (0.05 mole) of aniline hydrochloride in 40 ccs. of acetic acid are refluxed for 2 hours and mechanically stirred. The reaction mixture is poured into water and sucked off. The precipitate is recrystallised from ethanol. 4.9 g. of white product melting at 256° C. are obtained. Yield: 4.9 g. (56%).

Example 12.—1-phenyl-3-(p-hexadecylanilino)-2-pyrazolin-5-one 8.75 g. (0.05 mole) of 1-phenyl-3-amino-2-pyrazolin-5-one and 17.7 g. (0.05 mole) of p-hexadecylaniline hydrochloride in 80 ccs. of acetic acid are refluxed for 2 hours. The reaction mixture is poured into water heated for a while and filtered. The precipitate is boiled in 100 ccs. of ethanol and filtered while warm. After recrystallisation from ethanol a crystalline product melting at 110° C. is obtained. Yield: 16.5 g. (69.5%).

p-Hexadecylaniline hydrochloride is prepared according to J. Gen. Chem. U.S.R.R. vol. 25 (1959) p. 2195.

Example 13.—1-phenyl-3-(p-hexadecyloxyanilino)-2-pyrazolin-5-one (A) Preparation according to our invention.

Example 12 is reiterated but p-hexadeclaniline hydrochloride is replaced by 18.5 g. (0.05 mole) of p-hexadecyloxy-anilino hydrochloride. After recrystallisation from ethanol 17.5 g. of bright scales melting at 137° C. are obtained. Yield: 71.2%.

(B) Preparation according to U.S. patent specification 3,127,269.

16.7 g. (0.05 mole) of p-hexadecyloxyaniline and 8.75 g. (0.05 mole) of 1-phenyl-3-amino-2-pyrazolin-5-one are refluxed for 4 hours in 80 ccs. of acetic acid and mechanically stirred. The resulting product is recrystallised twice from ethanol and is found to melt at 137° C. Yield: 8.5 g. or 34.6%. From the filtrates no product could be obtained anymore.

p-Hexadecyloxyaniline is prepared according to C, Pasini and A. Vercillone C.A. 50 (1956) 10023.

Example 14.—1-phenyl-3-(3-carboxy-4-hexadecylthio-anilino)-2-pyrazolin-5-one

Example 12 is reiterated but p-hexadecylaniline hydrochloride is replaced by 21.5 g. (0.05 mole) of 3-carboxy-4-hexadecylthioaniline hydrochloride. After boiling for 2 hours a compact white fibrous precipitate is formed. The precipitate is cooled, filtered, washed with water and boiled in ethanol. The product does not dissolve. It is then filtered while warm and washed with ethanol. Melting point: 223° C. Yield: 17.9 g. (65%).

2-hexadecylthio-5-nitro-benzoic acid.—60.45 g. of o-chloro-m-nitrobenzoic acid is dissolved in 75 ccs. of ethylene glycol monomethyl ether and is added while warm to 16.8 g. of potassium hydroxide dissolved in 100 ccs. of ethylene glycol monomethyl ether.

77.4 g. of hexadecylmercaptan is dissolved in 135 ccs. of ethylene glycol monomethyl ether in which 16.8 g. of potassium hydroxide are dissolved already. Both solutions are mixed and refluxed for 1 hour. A precipitate of potassium chloride is formed. The mixture is acidified with acetic acid, slightly heated and poured into 1500 ccs. of methanol. The yellow precipitate is filtered off. The product is recrystallised from acetic acid, washed with water till free from acid and dried at 90° C. It is then recrystallised from methanol. Melting point: 108° C.

3-carboxy-4-hexadecylthio - aniline hydrochloride.—55 g. (0.13 mole) of the nitro compound is dissolved in 440 ccs. of ethylene glycol monomethyl ether and reduced with Raneynickel at 60° C. and under hydrogen pressure of 1500 p.s.i. The mixture is cooled and filtered. The product is recrystallised from methanol. Melting point: 132° C. The resulting product is converted into the hydrochloride by dissolving in ethanol and adding the calculated amount of ethanolic hydrochloric acid.

Example 15.—1-β-hydroxyethyl-3-(p-hexadecylanilino)-2-pyrazolin-5-one 7.15 g. (0.05 mole) of β-hydroxyethyl-3-amino-2-pyrazolin-5-one, 17.68 g. (0.05 mole) of p-hexadecyl aniline hydrochloride in 40 ccs. of acetic acid are refluxed and stirred mechanically. Ammonium chloride starts precipitating already after 3 minutes. 150 ccs. of acetic acid are added after 30 minutes. The resulting mixture is filtered while warm. The product is recrystallised, filtered off and washed with methanol. It is recrystallised again in 300 ccs. of ethanol. Melting point: 142° C. Yield: 9.5 g. (42%).

Example 16.—1-phenyl-3-(β-naphthylamino)-2-pyrazolin-5-one 8.75 g. (0.05 mole) of 1-phenyl-3-amino-2-pyrazolin-5-one and 9 g. (0.05 mole) of β-naphthylamine hydrochloride are added to 50 ccs. of acetic acid. The resulting mixture is heated while mechanically stirring. Ammonium chloride starts precipitating after 15 minutes. The reaction goes on for 45 min. After cooling of the reaction mixture to 50° C., the solid product is filtered off, washed with water for eliminating the formed ammonium chloride and recrystallised from ethanol. White needles melting at 217° C. are obtained. Yield: 11.5 g. (76.6%).

Example 17.—N,N'-bis-(1-phenyl-5-oxo-2-pyrazolinyl-(3))-p-phenylenediamine 8.75 g. (0.05 mole) of 1-phenyl-3-amino-2-pyrazolin-5-one and 3.75 g. (0.025 mole) of p-phenylenediamine hydrochloride in 100 ccs. of acetic acid are refluxed for 2 hours and stirred. The reaction components do not completely dissolve. The mixture is then poured into water and the obtained precipitate is filtered off and washed with water. The resulting product does not dissolve in boiling ethanol. A grey powder melting above 280° C. is obtained. Yield: 10 g. (50%).

Example 18.—1-(2,2,2-trifluoro-ethyl)-3-(p-hexadecyloxyanilino)-2-pyrazolin-5-one 9.05 g. (0.05 mole) of 1-(2,2,2-trifluoroethyl)-3-amino-2-pyrazolin-5-one, prepared according to our U.S. patent application Ser. No. 472,017, filed July 14, 1965, and 18.5 g. (0.05 mole) of 4-hexadecyloxyaniline hydrochloride in 70 ccs. of acetic acid are refluxed for 90 min. whilst stirring. The mixture is then poured into water and the precipitate obtained is filtered off and washed with water. The resulting product is boiled in 50 ccs. of ethanol and filtered whilst warm. After recrystallisation from ethanol a white product melting at 120° C. is obtained. Yield: 14 g. (56%).

Example 19.—1-[5-(N-methyl-N-hexadecyl)-sulphamoyl]-2-pyridyl-3-anilino-2-pyrazolin-5-one 12.4 g. (0.025 mole of 1-[5-(N-methyl-N-hexadecyl)-sulphamoyl]-2-pyridyl - 3 - amino-2-pyrazolin-5-one and 3.25 g. (0.025 mole) of aniline hydrochloride are refluxed for 90 min. and stirred mechanically. The mixture is poured into water and the precipitate obtained is filtered off, washed with water, and recrystallised from ethanol. A yellowish product melting at 144° C. is obtained. Yield: 9.5 g. (68%).

We claim:

1. In a process for the preparation of a 3-arylamino-2-pyrazolin-5-one compound from a 3-amino-2-pyrazolin-5-one having the structure:

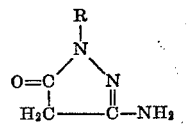

wherein:

R represents a hydrogen atom or a carbon-linked organic group selected from the group consisting of alkyl, phenyl, and 2-pyridyl, and a primary amine selected from the group consisting of naphthyl amine and

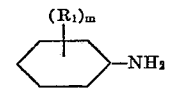

wherein:

R₁ is selected from the group consisting of alkyl, aryl, halogen, carbethoxy, alkanoyl, alkanoylamino, alkoxy, alkylthio, alkylsulphonyl, amino, alkylamido, amilino, arylamido, carbamyl, carboxy, cyano, hydroxyl, nitro, sulfamyl, aryloxy, arylthio, arylsulphonamido, arylsulphonyl, arylureido, and fluorosulphonyl; and m has a value of 0–2, said process being carried out in a lower alkanoic acid reaction medium, the improvement comprising the step of heating a salt of a mineral acid or p-toluenesulphonic acid and said primary amine with said 3-amino-2-pyrazolin-5-one in said reaction medium.

2. A process according to claim 1 wherein the mineral acid is selected from the group consisting of hydrochloric acid, hydrobromic acid, and sulfuric acid.

3. A process according to claim 2 wherein the mineral acid is hydrochloric acid.

4. A process according to claim 1 wherein the reaction medium comprises acetic acid.

5. A process according to claim 1 wherein the reaction medium is heated such that the solvent refluxes and the reactants are completely dissolved.

6. In a process for the preparation of a 3-arylamino-2-pyrazolin-5-one compound from a 3-amino-2-pyrazolin-5-one having the structure:

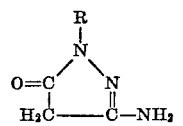

wherein:

R represents a hydrogen atom or a carbon-linked organic group selected from the group consisting of alkyl, phenyl, and 2-pyridyl, and a primary amine selected from the group consisting of naphthyl amine and

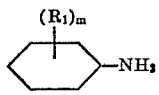

wherein:
$R_1$ is selected from the group consisting of alkyl, aryl, halogen, carbethoxy, alkanoyl, alkanoylamino, alkoxy, alkylthio, alkylsulphonyl, amino, alkylamino, anilino, arylamido, carbamyl, carboxy, cyano, hydroxyl, nitro, sulfamyl, aryloxy, arylthio, arylsulphonamido, arylsulphonyl, arylureido, and fluorosulphonyl; and
$m$ has a value of 0–2, said process being carried out in a reaction medium inert to the reactants, the improvement comprising the step of heating a salt of a mineral acid or p-toluenesulphonic acid and said primary amine with said 3-amino-2-pyrazolin-5-one in a reaction medium selected from the group consisting of ethylene glycol monomethyl ether and tetrahydrothiophene-1,1-dioxide.

7. A process according to claim 6 wherein the mineral acid is selected from the group consisting of hydrochloric acid, hydrobromic acid, and sulfuric acid.

8. A process according to claim 7 wherein the mineral acid is hydrochloric acid.

9. A process according to claim 6 wherein the reaction medium is heated such that the solvent refluxes and the reactants are completely dissolved.

References Cited

UNITED STATES PATENTS 3,127,269   3/1964   Greenhalgh et al. ____ 260—310

FOREIGN PATENTS 956,261   4/1964   Great Britain.
141,485   1/1961   U.S.S.R.

OTHER REFERENCES

Houben-Weyl: Methoden der Organischen Chemie, vol. XI I, pp. 248–56 and 261–7, George Thieme, Stuttgart, 1957.

HENRY R. JILES, Primary Examiner

NATALIE TROUSOF, Assistant Examiner

U.S. Cl. X.R.

96—56.1; 260—162, 163, 295, 310, 454, 465, 471, 505, 516, 518, 553, 556, 558, 562, 575, 576, 577, 578